United States Patent [19]
Willis

[11] Patent Number: 5,305,974
[45] Date of Patent: Apr. 26, 1994

[54] SPACESHIP PROPULSION BY MOMENTUM TRANSFER

[76] Inventor: Robert C. Willis, 1365 Fox Gap Rd., Bangor, Pa. 18013

[21] Appl. No.: 734,797

[22] Filed: Jul. 23, 1991

[51] Int. Cl.[5] ............................................. B64G 1/00
[52] U.S. Cl. ................................. 244/158 R; 244/172; 244/63
[58] Field of Search ...................... 244/172, 158 R, 63; 335/219, 216

[56] References Cited

U.S. PATENT DOCUMENTS

| | | | |
|---|---|---|---|
| 4,795,113 | 1/1989 | Minovitch | 244/63 |
| 5,017,549 | 5/1991 | Robertson | 244/63 R |
| 5,024,137 | 6/1991 | Schroeder | 244/634 |

OTHER PUBLICATIONS

Nickelsen, "Electric Propulsion for Space Flight", Nov. 1960.
Lemke, "Magnetic Acceleration of Interstellar Probes", 1982.
'Radio Electronics', Jul. 1990, p. 4.
H. H. Kolm, 'Space Manufacturing 3', Oct. 31, 1979, pp. 31-36, 299-306.
T. A. Happenheimer, 'Journal of the British Interplanetary Society', vol. 30, 1977, pp. 301-309.
T. A. Heppenheimer, 'Journal of Spacecraft', vol. 15, #3, 1978, pp. 176-183.
T. A. Heppenheimer, 'Journal of Spacecraft', vol. 15, #4, 1978, pp. 242-249.
'Aerospace America', Mar. 1990, p. 48.
'Scientific American', Apr. 1990, p. 48.
H. H. Kolm, 'IEEE Transactions on Magnetism', vol. 16, #5, Sep. 1980, pp. 719-721.
T. A. Heppenheimer, 'Lunar Bases & Space Activities of the 21st Century', pp. 155-167.
G. K. O'Neill, 'The High Frontier', 1977, pp. 132-147, 191-199.
H. H. Kolm, 'Space Manufacturing 4', Aug. 1981, pp. 17-19.
'Space Manufacturing 4', Aug. 1981, pp. 157,173.
'Aviation Week and Space Technology', Aug. 29, 1988, p. 71.
'Aviation Week and Space Technology', May 7, 1990, pp. 88-89.
'Aviation Week and Space Technology', Jul. 23, 1990, pp. 78-79.
'Space Manufacturing 5', Oct. 1985, pp. 97-98.
'Space Manufacturing 6', Aug. 1987, pp. 302-309.
"The Starflight Handbook", by E. F. Mallove and G. L. Matloff, pp. 145-146, 1979.

Primary Examiner—Margaret A. Focarino
Assistant Examiner—Christopher P. Ellis
Attorney, Agent, or Firm—Arthur P. Gershman

[57] ABSTRACT

A propulsion system for spaceships wherein a first electromagnetic projectile launcher (EMPL) accelerates "smart" projectiles into space and on appropriate trajectories to rendezvous with a distant spaceship at some later time. The smart projectiles stabilize themselves in space using a system of on board thrusters operated by computers. Laser beams and radio transmissions are directed at the spaceship and are monitored by sensors aboard the spaceship. Computers on board the spaceship determine any necessary course corrections for the projectiles based upon the spaceship's sensor system. Appropriate commands are radioed to the projectiles which execute the commanded maneuvers to alter their trajectories. The spaceship carries a second EMPL and a nuclear-powered electricity generating facility to provide electricity to operate the EMPL. The spaceship, the second EMPL and the nuclear power facility are all rotated axially about the long axis of the EMPL to provide both gyroscopic stabilization and also artifical gravity for the crew of the spaceship. The second EMPL is used to catch the projectiles which transfers the momentum of the projectiles to the spaceship thereby accelerating it in the desired direction. Additional acceleration of the spaceship is achieved by again launching the captured projectiles in a direction opposite to the desired direction of motion of the spaceship. The spaceship can be decelerated in a similar manner. Mars can be reached in two months using this system.

4 Claims, 2 Drawing Sheets

SPACESHIP PROPULSION BY MOMENTUM TRANSFER

BACKGROUND

1. Field of Invention

This invention relates to propulsion systems for spaceships, specifically, to a system which uses primarily momentum transfer to propel the spaceship instead of fuel. The "propellent" in this propulsion system consists of numerous "smart" fast-moving projectiles most of which are not carried on board the spaceship. It is this last point where this invention differs from all previous propulsion systems.

2. Discussion of Prior Art

We shall restrict the following discussion to spaceships which will carry live human crews whose intention is to return to Earth alive eventually; however, the propulsion system described herein can be used to propel one-way human crew spaceships as well as unmanned spaceships. This technique can also be used to transfer material from point to point across vast distances of space where either or both points may be in space. The material transferred may be fuel, water, raw materials, finished products or anything else we wish to transfer. We use the term spaceship to refer to any man-made device which is sent into space for any purpose, whether or not it is carrying humans.

Nearly all spaceship propulsion systems currently known involve some type of fuel which is carried on board the spaceship. Said fuel is expelled from the spaceship at some rate and velocity. The force produced by this expulsion of fuel acts on the spaceship in the opposite direction to accelerate the spaceship according to Isaac Newton's third law of motion.

There are only two "fuelless" spaceship propulsion systems which are well known; namely, starsailing, in which light pressure from a nearby star such as our Sun, pushes the spaceship which consists mostly of a huge sail. It is questionable if this method of propulsion can be used to move humans from planet to planet. The other fuelless system is the interstellar ramjet, wherein the fuel used by the spaceship is actually the hydrogen gas which exists in interstellar space. This method is of no use for travel within our Solar system.

In general the relative velocity of such a spaceship is limited by the amount of fuel carried on board and is roughly equal to the integral of the acceleration over time. At the present time there are no extraterrestrial refueling facilities, consequently current spaceships must carry fuel for the return journey as well. In fact a great deal of valuable fuel is wasted because its only use is to push the fuel that will be needed later. The net result is (a) that current propulsion systems limit the payload to a few percent (usually less than five percent) of the total initial mass of the spaceship. Said payload includes: the crew, their food, air, waste facilities, cameras, control and communications equipment, and all other equipment needed to accomplish the goals of the mission.

This also leads to a number of other undesirable results:

(b) The cost of a single space voyage is exceptionally high.

(c) Due to the relatively low velocity attainable with current propulsion systems, the duration of a space voyage to the nearest planets, Mars or Venus, is excessive, perhaps as long as a year.

(d) Also due to the low velocity, the ultimate range of current propulsion systems is also limited.

(e) Assuming the crew doesn't succomb to boredom or claustrophobia, the long trip in a microgravity environment may severely endanger the health of the crew due to bone calcium loss.

(f) Only a small crew can be accommodated which means not only a high cost per person, but also that very few people will be able to enjoy the "fantastic voyage" and political support for the project will be low.

SUMMARY AND OBJECTS OF THE INVENTION

In view of the foregoing limitations and disadvantages of the prior art of spaceship propulsion and interplanetary travel systems, as well as other shortcomings not specifically mentioned above, it is one primary objective of this invention to provide a spaceship propulsion system which requires very little fuel.

More particularly, it is an object of this invention to provide a spaceship propulsion system which permits the payload to exceed 25% of the initial mass of the spaceship.

It is another object of this invention to provide a spaceship propulsion system which allows a crew in excess of one thousand persons.

Yet another object of this invention is to provide a spaceship propulsion system which can achieve significantly greater velocities and thereby extend the range of possible voyages and also reduce the duration of such voyages.

Still another object of the invention is to provide a spaceship propulsion system which will reduce the crew's bone calcium loss.

It is yet another important object of this invention to provide a spaceship propulsion system which greatly reduces the cost per person of interplanetary travel.

Yet another object of this invention is to provide a mass transfer system which requires very little fuel.

Still another object of the invention is to provide a mass transfer system which greatly reduces the cost per kilogram of delivered materials.

Yet another object of this invention is to provide a mass transfer system which can achieve a very high transfer velocity thereby greatly reducing the transfer time over a fixed distance or conversely greatly extenting the transfer range over a fixed time.

Still another object of the invention is to provide a lunar supply system which requires very little fuel.

Yet another object of this invention is to provide a lunar supply system which greatly reduces the cost per kilogram of delivered material.

It is still another object of the invention to provide a lunar transfer system which can achieve a very high transfer velocity thereby greatly reducing the time required to deliver materials to the Moon.

BRIEF THEORETICAL DISCUSSION AND DEFINITION

Isaac Newton (1642-1727) stated his third law of motion as follows: "To every action there is always opposed an equal reaction; or, the mutual actions of two bodies upon each other are always equal and directed to contrary parts." This invention recognizes that a spaceship can be propelled simply by momentum transfer according to Newton's third law of motion. In this preliminary section, we will describe the operation of the invention in words only. A subsequent section will provide the physics, the equations, and sample calculations which will indicate the expected performance.

In the following specification and claims we will use the acronym EMPL instead of "electromagnetic projectile launcher", such EMPLs being well known in the art, as evidenced by, e.g. the article appearing in Aviation Week & Space Technology, Jan. 27, 1986, at page 21, entitled "Railgun Experiments Strive for High Velocity, Repetition" incoporated herein by reference.

DRAWING REFERENCE NUMBERS

Figure 1:
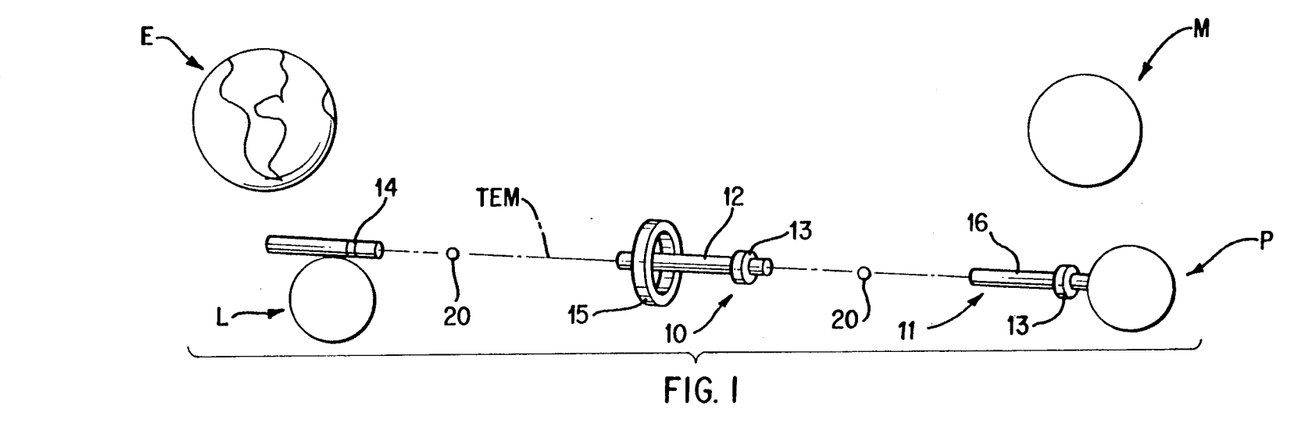
FIG. 1 is a diagrammatic view of the spaceship propulsion system, including the spaceship, illustrating the propulsion of the spaceship from high Earth orbit to Mars in accordance with the first embodiment of the invention.

FIG. 1—Spaceship propulsion system (not to scale)
E Earth
L Moon
M Mars
P Phobos
10 manned spaceship (not drawn to scale) elements illustrated are:
12 electromagnetic projectile launcher (EMPL)
13 nuclear-powered electricity generating facility
15 living quarters of crew
elements not illustrated are:
(a) components of 12
(b) components of 13
(c) components of 15
(d) laser beam sensors located at each end of 12
(e) radio communications equipment and antennae
(f) hydroponic food production facilities
(g) waste recycling facilities
(h) sun and star sensors
(i) computers and other data processing equipment
(j) structural members
(k) maneuvering thrusters and propellent tanks
(l) projectile handling equipment
(m) projectile storage facilities etc.
11 unmanned spaceship (not drawn to scale) elements illustrated are:
16 electromagnetic projectile launcher (EMPL)
13 nuclear-powered electricity generating facility
elements not illustrated are:
(a) components of 16
(b) components of 13
(c) laser beam sensors located at each end of 16
(d) radio communications equipment and antennae
(e) sun and star sensors
(f) computers and other data processing equipment
(g) structural members
(h) maneuvering thrusters and propellent tanks
(i) projectile handling equipment
(j) projectile storage facilities etc.
14 Lunar EMPL (not drawn to scale) elements not illustrated are:
(a) components of 14
(b) electric power source or its components
(c) radio communications equipment and antennae
(d) sun and star sensors
(e) computers and other data processing equipment
(f) structural members
(g) projectile handling equipment
(h) projectile storage facilities etc.
20 projectiles
FIG. 2—mass transfer system (drawing not to scale)
E Earth
L Moon
M Mars
P Phobos
25 "source" system (not drawn to scale) elements illustrated are:
21 electromagnetic projectile launcher (EMPL)
23 nuclear-powered electricity generating facility
elements not illustrated are:
(a) components of 21
(b) components of 23
(c) radio communications equipment and antennae
(d) sun and star sensors
(e) computers and other data processing equipment
(f) structural members
(g) maneuvering thrusters and propellent tanks
(h) projectile handling equipment
(i) projectile storage facilities etc.
28 "destination" system (not drawn to scale) elements illustrated are:
22 electromagnetic projectile launcher (EMPL)
24 nuclear-powered electricity generating facility
26 large deadweight mass
elements not illustrated are:
(a) components of 22
(b) components of 24
(c) laser beam sensors located at the end of 22
(d) radio communications equipment and antennae
(e) sun and star sensors
(f) computers and other data processing equipment
(g) structural members
(h) maneuvering thrusters and propellent tanks
(i) projectile handling equipment
(j) projectile storage facilities etc.
20 projectiles
FIG. 3—Lunar supply system (drawing not to scale)
E Earth
A Mountain peak
19 Earth EMPL (not drawn to scale) elements not illustrated are:
(a) components of 19
(b) electric power source or its components
(c) radio communications equipment and antennae
(d) computers and other data processing equipment
(e) structural members
(f) projectile handling equipment (g) projectile storage facilities etc.

Figure 3:
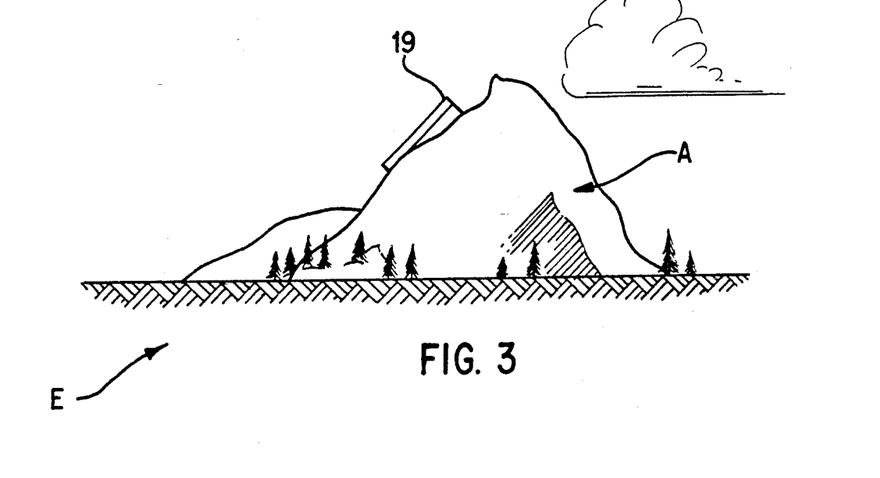
FIG. 3 is a pictorial representation illustrating the third embodiment of the invention in which an EMPL is positioned on the side of a peak of a high mountain in accordance with the invention.

Also not illustrated is the Lunar guidance facility.

Figure 4A:
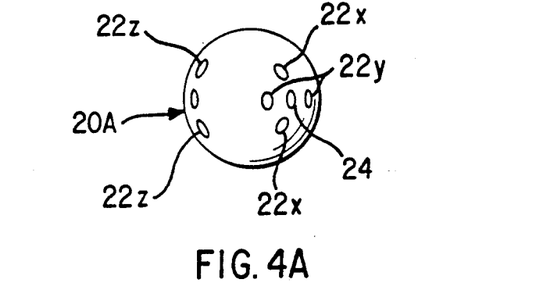
FIG. 4A is a front (or back) view of the projectiles used in the EMPLs of the first and second embodiments of the invention.

FIG. 4A—front and back view of projectile 20 elements illustrated are:

32X a pair of thruster ports for rotation or translation of the projectile in the X-dimension
32Y a pair of thruster ports for rotation or translation of the projectile in the Y-dimension
32Z a pair of thruster ports for rotation or translation of the projectile in the Z-dimension
34 laser port
35 antenna port elements not illustrated are:
(a) electric power source or its components
(b) radio communications equipment and antennae
(c) computers and other data processing equipment
(d) structural members
(e) thruster control mechanisms
(f) thruster propellent tanks
(g) antennae extension and retraction equipment
(h) superconducting circuits
(i) internal payload compartments if any
(j) laser or its components
(k) Sun or star sensors etc.

Figure 4B:
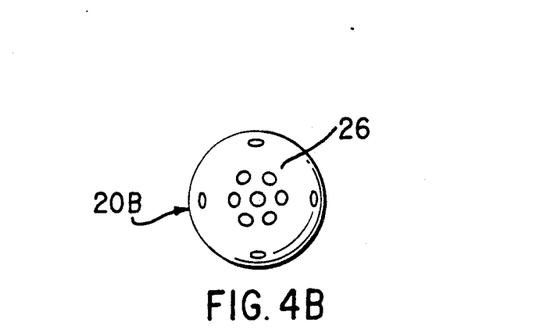
FIG. 4B is a top (or bottom) view of the projectiles used in the EMPLs of the first and second embodiments of the invention.

FIG. 4B—top and bottom view of projectile 20 elements illustrated are:

32X a pair of thruster ports for rotation or translation of the projectile in the X-dimension
32Z a pair of thruster ports for rotation or translation of the projectile in the Z-dimension
31 Sun sensor aperture
30 star sensor aperture elements not illustrated are:
(a) electric power source or its components
(b) radio communications equipment and antennae
(c) computers and other data processing equipment
(d) structural members
(e) thruster control mechanisms
(f) thruster propellent tanks
(g) antennae extension and retraction equipment
(h) superconducting circuits
(i) internal payload compartments if any
(j) laser or its components
(k) Sun or star sensors etc.

Figure 4C:
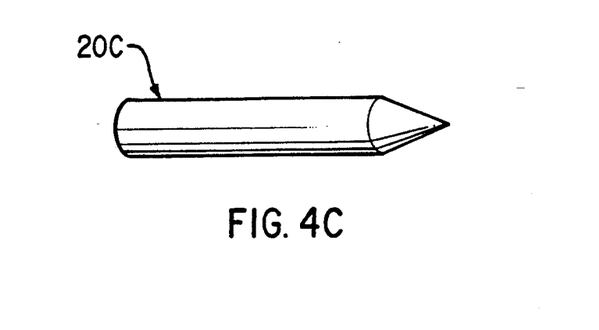
FIG. 4C is an illustration of the projectile used in the third embodiment.

FIG. 4C—projectile 20C of Lunar supply system element illustrated is:
37 ablative nosecone elements not illustrated are:
(a) electric power source or its components
(b) radio communications equipment and antennae
(c) computers and other data processing equipment
(d) structural members
(e) thruster control mechanisms
(f) thruster propellent tanks
(g) antennae extension equipment
(h) superconducting circuits
(i) internal payload compartments
(j) laser or its components
(k) Sun or star sensors etc.

DETAILED DESCRIPTION OF THE PREFERRED EMBODIMENTS

Referring now to FIG. 1 of the drawings, it will be seen that a spaceship, generally indicated by the reference numeral 10 is traveling along a trajectory TEM between the Moon L of Earth E and Phobos P, a moon of Mars M. A first EMPL 14 which is physically separate from the spaceship is used to accelerate magnetic projectiles 20 to very high velocities thus converting electric power into kinetic energy of the projectiles via a series of interacting magnetic fields in the EMPL 14 and the projectile 20. This kinetic energy can also be interpreted as a quantity of momentum equal to the product of the mass of each projectile times the velocity of that projectile (ignoring relativistic effects since they will be negligible). Of course before each projectile is launched, the EMPL is pointed in an appropriate direction such that when the projectile exits the launcher its trajectory is such that the projectile will as nearly as possible intercept the trajectory of the target spaceship at some time in the future—which will be a function of the velocity of the projectile relative to the distant spaceship and the distance of separation between the projectile and the spaceship.

The optimal location for the first electromagnetic projectile launcher is the Moon—specifically the North pole or the South pole of the Moon. There are multiple reasons for these selections. First, the Moon has no atmosphere and therefore the launcher will have no problem with atmospheric resistence to the flight of the projectiles. Second, the poles of the Moon are the only two points on the surface of the Moon which remain fixed relative to the distant stars at all times during the orbiting of the Moon around the Earth. This is crucial because it means that you can launch projectiles continuously (except for eclipses of the Earth) toward any target in the plane of the ecliptic. Thirdly, the materials from which the launcher will be constructed will come from the Moon and will therefore be free! Fourthly, it is possible that this launcher can be powered by solar panels instead of a nuclear reactor. (If you assume 15% efficiency, it would take about 2 million square meters of solar panels to generate 400 mega-watts of power. It is clear that solar panels could be manufactured from indigenous materials and would therefore be virtually without cost.)

The spaceship 10 will be carrying a second EMPL 12 which will function not only as a projectile launcher but also as a projectile catcher. It is clear that this can be done since the action of catching a projectile is the natural opposite of launching a projectile; namely, a deceleration instead of an acceleration. Now let us consider what happens when each projectile is caught. As the projectile 20 approaches the spaceship, it will be moving very fast relative to the spaceship 10 and then said second EMPL 12 will catch said projectile—thereby stopping it within said second EMPL. The relative momentum of each projectile 20 before it is caught will be the product of its mass times its velocity relative to the spaceship. The relative momentum of each projectile will be transferred to the spaceship (plus the projectile) during the catching operation. Notice that before the projectile is caught, both it and said spaceship will be travelling in the same direction, thus it is clear that the projectile will act to push(accelerate) said spaceship in the same direction it was previously moving. The magnitude of the acceleration experienced by said spaceship will be a function of the time period of the deceleration of the projectile and the ratio of the mass of said spaceship to the mass of said projectile.

After a group of projectiles 20 has been caught by said second EMPL 12, said second EMPL will then be used to launch said projectiles 20 again, one at a time. Depending upon the desired trajectory of said spaceship, the direction in which said second EMPL is pointing may be adjusted before said projectiles are relaunched. As each said projectile is launched, said spaceship will be pushed in the opposite direction in accordance with Newton's third law of motion and in an amount which can be determined by the law of conservation of momentum. Again, the magnitude of the acceleration of said spaceship will be a function of the period of the acceleration of said projectiles and the ratio of the mass of said spaceship including all projectiles still on board to the mass of said projectile being launched.

Very large power sources are required to operate said first EMPL 14 and said second EMPL 12. Nuclear-powered electricity generating facilities 13 are clearly capable of providing the required power. A standard commercial nuclear power station generates about 1500 megawatts of power. Nuclear power facility 13 is now and will be for the foreseeable future the only feasible power source capable of operating such large EMPL's in space on board spaceships; however, large EMPL's could be built on Earth, the Moon, Mars, or major satellites of Jupiter which could possibly be powered by other methods such as solar power although nuclear power would be recommended even for those. Power provided by said nuclear power facility 13 on board said spaceship will be used not only to operate the second EMPL 12, but also to satisfy virtually all of the other electrical power requirements on board said spaceship.

Said second EMPL 12 together with said nuclear-powered electricity generating facility 13 together with the crew's quarters 15 of said spaceship will be rotated axially about the long axis of said second EMPL. The purpose of this is twofold. First, the rotation of the entire system essentially makes it a giant gyroscope and thereby stabilizes it in space. This is crucial because otherwise the motion of the crew inside the spaceship could disturb the alignment of the spaceship and possibly cause the projectile to impact the spaceship instead of entering said second EMPL in the desired manner. The second purpose is to create artificial gravity on board said spaceship. This is important for many reasons such as:
(a) Humans can work more easily in an artifical gravitational field than in micro-gravity.
(b) It is clear that plants will grow normally in an artifical gravitational field whereas it is not clear they will do so in micro-gravity.
(c) Clearly eating, and preparing food will be easier.
(d) Clearly personal functions will be more easily accomplished and the facilities will be much cheaper.
(e) Humans will not suffer muscle atrophy and special exercise programs will not be necessary.
(f) Since the crew will experience a near normal artifical gravity, their bodies will not suffer bone calcium losses.

The key components of this propulsion system (and the mass transfer system which is the second embodiment of this invention) are the "smart" projectiles 20.

Referring now to FIG. 4A and 4B, a projectile 20, for use in connection with the first embodiment of the invention is illustrated. The simplest shape for said projectiles, although by no means the only shape, is a sphere. Said projectiles are launched by said first EMPL 14. Soon after each projectile leaves said first EMPL, the radio communications antennae (not illustrated) are extended and the alignment process begins. Sun sensors (not illustrated) are used to find the Sun and on board computers operate some of the thrusters 32x, 32y, and 32z (two pairs each) to stabilize said projectile and point its narrow beam laser 34 toward the distant spaceship. Star sensors and star maps are then used by the on board computers to further refine the orientation of said projectile in a similar manner. At this point homing transmissions will be initiated by said projectile. These will be monitored by said spaceship. If the sensors on board said spaceship determine that course corrections are needed, the appropriate commands will be radioed to said projectile and some of the thrusters on board said projectile will be used to correct the trajectory of said projectile. This process will be repeated until said spaceship can acquire said narrow beam laser. The computers on board said spaceship may also rotate said spaceship in order to help bring the trajectory of said projectile into close alignment with the second EMPL 12 on board said spaceship 10. When said projectile is properly aligned, said laser beam will impinge upon a detector (not illustrated) positioned at the far end of said second EMPL. Said detector will consist of a plurality of sensors which are sensitive to the same wavelength of radiation being emitted by said laser 34.

At a point in time approximately one minute before said projectile will reach said spaceship, a decision must be made as to whether to accept said projectile or to reject it. If said projectile is to be accepted, then a command will be sent to said projectile to tell it to prepare for acceptance—which will cause said projectile to retract its communications antennae. If said projectile is to be rejected, an abort command will be sent to the projectile which will cause it to accelerate perpendicularly to its current trajectory so that said projectile will miss said spaceship entirely. Of course, if said communications antennae fail to retract when commanded or if communication with said spaceship is lost for more than a predetermined period, said projectile will automatically abort its flightpath so as to avoid hitting said spaceship.

The preceding paragraph has described in general how the projectiles 20 would stabilize themselves in the proper orientation and how each projectile would be aligned with said on board EMPL 12 as it approached said spaceship 10 just prior to being caught. It is now appropriate to introduce the analogy of a train. As a train moves along, each traincar simply follows the one in front of itself and only the first traincar (the engine) determines where the train goes. Imagine that our 'train' consists of a series of groups of projectiles. Each projectile will primarily watch the one immediately in front of itself and secondarily the one immediately following. Each time a trajectory change is required, it will be passed backward from projectile to projectile and from group to group thus keeping the whole train lined up. Clearly this reduces the burden on said spaceship 10 by orders of magnitude because said spaceship need not worry about several thousand incoming projectiles, but can instead concentrate on those few who are the closest to said spaceship. The separation between projectiles will be about one to three thousand kilometers while the separation between groups will be several hundred thousand kilometers and the projectile last launched from the Moon L may be millions of kilometers from said spaceship 10. It is clear that by distributing the guidance responsibility we can reduce the burden on said spaceship. Group intelligence can be employed to yield a level of performance beyond the capabilities of the individual projectile 20. Naturally a large number of contingencies must be anticipated and programmed into the computer systems so that the loss of one or more systems or projectiles cannot compromise the remaining ones or cause the loss of said spaceship.

We have in fact completed the explanation of the operation of the propulsion system but we haven't explained how to use this propulsion system to make a round trip to Mars (or elsewhere). So far we have shown only how the spaceship can be accelerated from the neighborhood of the Moon out toward a distant body such as Mars. It should be clear that conversely if a returning spaceship were approaching the Moon, projectiles launched from the Moon toward the approaching spaceship would decelerate said spaceship when they were caught. Thus the same operation which sent said spaceship on its way will also stop it upon its return. Therefore, we need only explain how said spaceship will be stopped in the neighborhood of its destination, say Mars, and how it will be started on its journey home. Of course, the astute reader will probably have already guessed that the answer is simply a variation of the theme.

The answer is to send an unmanned spaceship 11 to the destination first. This spaceship 11 will of course have its own EMPL 16 and nuclear-powered electricity generating facility 13, but its primary cargo will be several thousand "smart" projectiles. In addition, when more projectiles are thrown from the Moon to accelerate said spaceship, those projectiles will be saved when they are caught and not re-launched. We do not want said unmanned spaceship to go very fast—for the following reason. The faster said spaceship goes, the more projectiles will be required to stop it. Imagine that the approach velocity is 2 kilometers per second. Suppose that the on board EMPL can throw projectiles at 12 kilometers per second. Then the ratio of the projectile velocity to the velocity of the spaceship would be 6. By applying the law of conservation of momentum, we conclude that we must expell about 1/6 of the total mass in order to stop the spaceship. Of course we don't really want to stop it. The actual goal is to maneuver said unmanned spaceship 11 into a nearly circular orbit around Mars and then to match the orbital motion of the Martian satellite called Phobos. When that is accomplished, said spaceship will attach itself to Phobos. This should not be difficult and should not damage said spaceship because the gravitational field of Phobos is quite small (less than 0.1 meters per second per second).

Now imagine that the second spaceship 10 (i.e. the one with the human crew) is approaching Mars. The EMPL 16 on Phobos will then begin throwing projectiles toward said second spaceship 10. As these projectiles are caught, said second spaceship 10 will be decelerated. By catching and throwing back a sufficient number of projectiles 20, said second spaceship can also be maneuvered into orbit around Mars M. Of course the final step is now clear. The Phobos EMPL 16 will simply throw more projectiles to said second spaceship 10 to send it back toward Earth E.

The reason that this works is that the mass of Phobos is just right. Its mass is small enough that said unmanned spaceship 11 can land on it without crashing, but it is also large enough that the momentum imparted to it by the launching of thousands (even millions) of projectiles will not materially effect the orbit of Phobos. The mass of Phobos is about 10,000,000,000,000 metric tons which is many billions of times as massive as said unmanned spaceship.

SECOND MAJOR EMBODIMENT OF THE INVENTION

Figure 2:
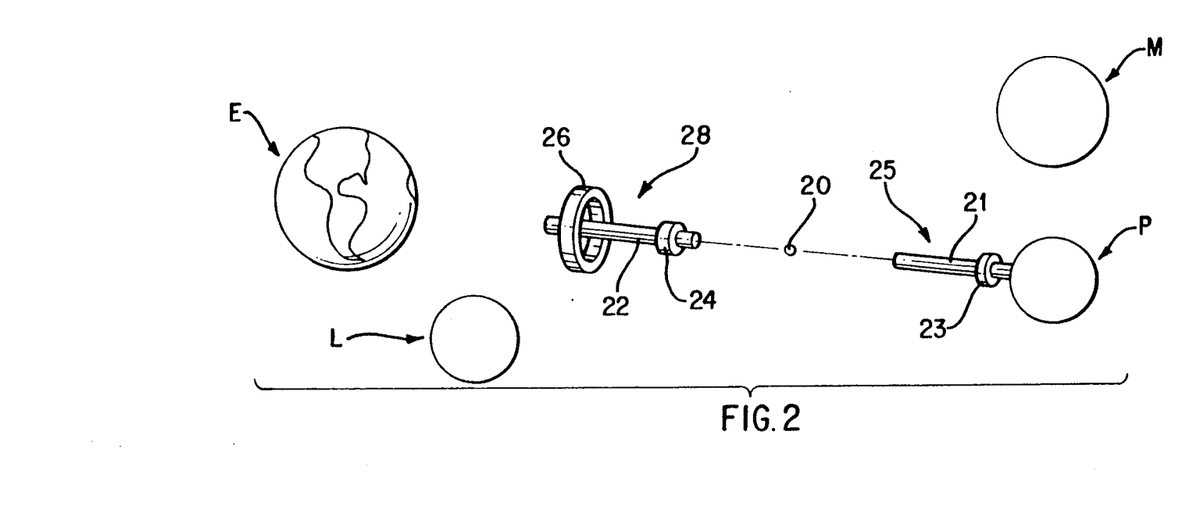
FIG. 2 is a diagrammatic view illustrating the second embodiment of the invention in which at least two EMPLs are used in a mass transfer system through space, in accordance with the invention.

The second major embodiment of this invention is a mass transfer system for transferring mass from one point to another over long distances wherein either or both points may be in space as shown in FIG. 2.

The operation of the mass transfer system depends upon its configuration. The normal configuration will consist of a first EMPL 21 and its power supply 23 (the "source" system 25), a second EMPL 22 and its power supply 24 (the "destination" system 28) which will be at some distant point, a plurality of "smart" projectiles 20 which will be nearly identical to those described above, and finally, means to help guide said projectiles from said "source" system to said "destination" system. Another useful configuration is given below in the third major embodiment of the invention.

The primary difference between the projectiles used by the propulsion system and those projectiles used by the mass transfer system is that the latter contain at least one compartment which is used the contain the payload. The caliber of the projectiles can be the same so as to allow the use of both types of projectiles in either embodiment. Other projectile differences will be minor.

If either the source system or the destination system is in space, then its power supply will be a nuclear powered electricity generating facility and both said nuclear power facility and its associated EMPL will be rotated axially about the longitudial axis of said EMPL to provide gyroscopic stabilization.

The operation of the mass transfer system in the normal configuration will be exactly the same as the operation of the spaceship propulsion system except that the projectiles will not be relaunched after they are caught-—unless of course there is a desire to transfer mass either back to the source system or on to another destination system which might be part of a relay type system or a multi-step transfer system.

THIRD MAJOR EMBODIMENT OF THE INVENTION

The third major embodiment of this invention is a lunar supply system for transferring materials from the Earth to the Moon.

Referring now to FIG. 3 of the drawings, it will be seen that an EMPL 19 is in position on the Earth E in a particular location which will be described in detail hereinafter.

The operation of the lunar supply system depends upon its configuration. The normal configuration will consist of an EMPL 19 and its power supply (called the "Earth" system) located here on Earth, a plurality of "smart" projectiles 20C, and finally, means to help guide said projectiles from said "Earth" system to the desired target area of the Moon. These means include at least one guidance facility located on the Moon. This facility would include at least the following equipment: radio receiving and transmitting equipment, antennae, computers, heaters, a housing and support structure, and a power supply. This guidance facility will help to guide the projectiles to their intended targets.

The operation of the lunar supply system will be the same as the other systems except that the projectiles will not be caught. Instead they will be purposely crashed into the Moon. There are several reasons for this. First, no catcher is required on the Moon which means that the system can become operational much sooner. Second, no fuel will be needed to stop the projectile gently so the projectiles will weigh less and cost less. Third, no exhaust gases will be expelled into the lunar atmosphere which would spoil the (very useful and therefore valuable) hard vacuum which now exists on the Moon.

the optimal location for the Earth system is the West side of a tall mountain. There are several reasons for this. First, the launcher must point upward from the Earth to allow the projectile to get out of the Earth's atmosphere quickly, but the launcher is quite long (several kilometers) which necessitates either a deep hole or a tall tower or a mountain! Thus using a naturally occurring tower saves vast construction costs. Second, by using the West side of the mountain, we can take advantage of the rotation of the Earth (0.464 Km/sec at the equator) to reduce the required projectile velocity. Thirdly, by locating the EMPL on the side of a tall mountain, we can avoid most of the Earth's atmosphere. One of the best locations would be the Andes Mountains of South American perhaps in Chile or Peru. Since the projectiles will have to penetrate some of the Earth's atmosphere, their shape will be like a pencil.

The nosecone 37 will be covered with ablative material to protect the remainder of the projectile from friction with the atmosphere. The nosecone will also be designed to crush upon impact so that the payload will not be widely disbursed by the impact on the Moon.

The Moon is deficient in Hydrogen, Nitrogen, and Carbon. But these are precisely the elements needed to support a human colony on the Moon and therefore they must be imported from Earth. By throwing projectiles loaded with ice or graphite to the Moon we can fulfill this need. The ice-laden projectiles would be crashed into craters near the North pole or South pole of the Moon where the Sun never shines and thus would not evaporate the ice as would be the case if ice were dropped elsewhere on the Moon. The graphite laden projectiles could be crashed near any of the lunar colonies and retrieved at leisure.

The Physics and Mathematics of the Invention

Table 1

No fancy equations or physics are required to explain this invention. Simple concepts will do. Table 1 shows the acceleration required in thousands of Earth gravities (KG) to achieve the given velocity, V, in kilometers per second for electromagnetic projectile launchers of various lengths from 2 kilometers to 10 kilometers. The columns labeled by T give the time in seconds necessary to achieve the given velocity. Recall from basic physics that velocity equals the product of acceleration times time for a constant rate of acceleration. Also for a constant rate of acceleration, distance travelled equals one half of the product of that acceleration times the square of the time. Expressed in equations we have:

$$V = A*T \tag{1}$$

$$D = 0.5*A*T*T \tag{2}$$

By squaring the first equation and substituting into the second equation we get:

$$D = V*V/(2*A) \tag{3}$$

or $$A = V*V/(2*D) \tag{4}$$

Equation (4) was used to calculate the results of table 1 which were converted to KGs by dividing the result by 9800 meters per second per second. By substituting for A in equation (1) from equation (4) we get:

$$T = 2*D/V \tag{5}$$

TABLE 1

ACCELERATION REQUIRED FOR SPECIFIED PROJECTILE VELOCITY
LENGTH OF EMPL IN KILOMETERS

| | 2 | | 4 | | 6 | | 8 | | 10 | |
|---|---|---|---|---|---|---|---|---|---|---|
| V | KG | T | KG | T | KG | T | KG | T | KG | T |
| 5 | 0.64 | 0.80 | 0.32 | 1.60 | 0.21 | 2.40 | 0.16 | 3.20 | 0.13 | 4.00 |
| 10 | 2.55 | 0.40 | 1.28 | 0.80 | 0.85 | 1.20 | 0.64 | 1.60 | 0.51 | 2.00 |
| 15 | 5.74 | 0.27 | 2.87 | 0.53 | 1.91 | 0.80 | 1.43 | 1.07 | 1.15 | 1.33 |
| 20 | 10.20 | 0.20 | 5.10 | 0.40 | 3.40 | 0.60 | 2.55 | 0.80 | 2.04 | 1.00 |
| 25 | 15.94 | 0.16 | 7.97 | 0.32 | 5.31 | 0.48 | 3.99 | 0.64 | 3.19 | 0.80 |
| 30 | 22.96 | 0.13 | 11.48 | 0.27 | 7.65 | 0.40 | 5.74 | 0.53 | 4.59 | 0.67 |
| 35 | 31.25 | 0.11 | 15.62 | 0.23 | 10.42 | 0.34 | 7.81 | 0.46 | 6.25 | 0.57 |
| 40 | 40.82 | 0.10 | 20.41 | 0.20 | 13.61 | 0.30 | 10.20 | 0.40 | 8.16 | 0.50 |
| 45 | 51.66 | 0.09 | 25.83 | 0.18 | 17.22 | 0.27 | 12.91 | 0.36 | 10.33 | 0.44 |
| 50 | 63.78 | 0.08 | 31.89 | 0.16 | 21.26 | 0.24 | 15.94 | 0.32 | 12.76 | 0.40 |

Table 2

It is important to know how many of these smart projectiles are required to propel the spaceship. Table 2 shows the number of projectiles required (N) to increase the velocity of the spaceship by approximately one kilometer per second. The column labelled V is the velocity of the projectiles as they leave the first electromagnetic projectile launcher in kilometers per second. Of critical importance here is the ratio of the mass of the spaceship to the mass of the projectiles. Let that ratio be denoted by R, then we have:

$$R = \text{mass of spaceship/mass of projectile} \tag{6}$$

Let us define the following variables:
m = mass of projectile
v = velocity of projectile
p = momentum of projectile
M = mass of spaceship
V = velocity of spaceship
P = momentum of spaceship
M' = new mass of spaceship
V' = new velocity of spaceship The momentum of the projectile as it approaches the spaceship will be given by the product of its relative velocity and its mass:

$$p = (v - V)*m \tag{7}$$

The momentum of the projectile will be transferred to the spaceship (plus the projectile) when the electromagnetic projectile launcher on board the spaceship catches the projectile. We can calculate the velocity change for the spaceship from the law of conservation of momentum.

$$dV = p/M' \quad (8)$$

or $$dV = (v - V) * m/(M + m) \quad (9)$$

or $$dV = (v - V)/(R + 1) \quad (10)$$

Notice that the mass of the projectile cancells out in equation (10) leaving us with the ratio. Now we have the following:

$$M' = M + m = m*(R + 1) \quad (11)$$

$$dV = (v - V)*m/M' \quad (12)$$

$$V' = V + dV \quad (13)$$

By iteratively recalculating equations (11),(12), and (13) we can find a number N such that the final mass and velocity of the spaceship are given by:

$$M' = M + N*m \quad (14)$$

$$v' > = V + 500 \quad (15)$$

The spaceship has now caught N projectiles and next we will throw them back. In a similar manner we find the following:

$$dV = v*m/M \quad (16)$$

$$M' = M - m \quad (17)$$

$$V' = V + dV \quad (18)$$

Notice that in equation (16) there is no subtraction of the velocity of the spaceship. This is because the velocity of the spaceship relative to itself is zero. After we have thrown all the projectiles, we find that the mass of the spaceship is back to its original value and the velocity of the spaceship is at least one kilometer per second faster than when we started. The columns labelled VEL give the actual calculated velocity increase of the spaceship in meters per second. These numbers are shown for various values of R, the mass ratio.

TABLE 2

NUMBER OF PROJECTILES FOR 1 KM/SEC INCREASE IN SHIP VEL
MASS RATIO IN THOUSANDS

| | 1 | | 2 | | 3 | | 4 | | 5 | |
|---|---|---|---|---|---|---|---|---|---|---|
| V | N | VEL | N | VEL | N | VEL | N | VEL | N | VEL |
| 5 | 112 | 1004.25 | 223 | 1000.09 | 334 | 1000.37 | 445 | 1000.50 | 556 | 1000.58 |
| 10 | 53 | 1009.51 | 106 | 1004.64 | 158 | 1000.17 | 211 | 1000.07 | 264 | 1000.01 |
| 15 | 35 | 1008.02 | 69 | 1001.39 | 104 | 1003.68 | 138 | 1001.45 | 173 | 1002.82 |
| 20 | 26 | 1019.92 | 52 | 1000.06 | 77 | 1000.59 | 103 | 1000.49 | 129 | 1000.43 |
| 25 | 21 | 1008.53 | 41 | 1009.29 | 62 | 1000.86 | 82 | 1003.21 | 103 | 1004.32 |
| 30 | 17 | 1006.93 | 34 | 1007.06 | 51 | 1007.10 | 68 | 1007.12 | 85 | 1001.13 |
| 35 | 15 | 1003.11 | 29 | 1003.97 | 44 | 1003.77 | 58 | 1004.04 | 73 | 1003.90 |
| 40 | 13 | 1029.71 | 26 | 1009.85 | 38 | 1003.73 | 51 | 1000.29 | 64 | 1006.23 |
| 45 | 12 | 1025.16 | 23 | 1003.54 | 34 | 1011.33 | 45 | 1003.97 | 57 | 1008.26 |
| 50 | 11 | 1040.79 | 21 | 1016.69 | 31 | 1008.65 | 41 | 1004.63 | 51 | 1002.21 |

Table 3

Now we wish to calculate the acceleration of the spaceship during the catching and throwing of the projectiles. This is important because humans are fragile and cannot tolerate very high accelerations. For this calculations we have selected a electromagnetic projectile launcher 6 kilometers in length. We assume it is capable of launching projectiles according to table 1. Therefore the time to catch (or launch) a projectile will be the same as in table 1. Again V is in kilometers per second and T in seconds. It is clear that the more massive the spaceship, the less will be its acceleration. The deceleration (or acceleration) of the projectile is given by equation (4). The acceleration of the spaceship will be approximately:

| (19) | a = dV / dt | or |
| (20) | a = V * m / M / dt | from (16) or |
| (21) | a = V / R / dt | or |
| (22) | a = V / ( R * dt ) | but dt = T from (5) |
| (23) | a = V / ( R * 2 * D / V ) | or |
| (24) | a = V * V / ( 2 * D * R ) | substituting from (4) |
| (25) | a = A / R | |

Notice that the acceleration experienced by the spaceship is quite acceptable for velocities up to 25 kilometers per second when the mass ratio is two or three thousand. The columns labelled G are in Earth gravities.

TABLE 3

SHIP'S ACCELERATION FOR EMPL OF  6  KILOMETERS
MASS RATIO IN THOUSANDS

| | 1 | | 2 | | 3 | | 4 | | 5 | |
|---|---|---|---|---|---|---|---|---|---|---|
| V | G | T | G | T | G | T | G | T | G | T |
| 5 | 0.21 | 2.40 | 0.11 | 2.40 | 0.07 | 2.40 | 0.05 | 2.40 | 0.04 | 2.40 |
| 10 | 0.85 | 1.20 | 0.42 | 1.20 | 0.28 | 1.20 | 0.21 | 1.20 | 0.17 | 1.20 |
| 15 | 1.91 | 0.80 | 0.96 | 0.80 | 0.64 | 0.80 | 0.48 | 0.80 | 0.38 | 0.80 |
| 20 | 3.40 | 0.60 | 1.70 | 0.60 | 1.13 | 0.60 | 0.85 | 0.60 | 0.68 | 0.60 |
| 25 | 5.31 | 0.48 | 2.66 | 0.48 | 1.77 | 0.48 | 1.33 | 0.48 | 1.06 | 0.48 |
| 30 | 7.65 | 0.40 | 3.82 | 0.40 | 2.55 | 0.40 | 1.91 | 0.40 | 1.53 | 0.40 |
| 35 | 10.41 | 0.34 | 5.21 | 0.34 | 3.47 | 0.34 | 2.60 | 0.34 | 2.08 | 0.34 |
| 40 | 13.59 | 0.30 | 6.80 | 0.30 | 4.53 | 0.30 | 3.40 | 0.30 | 2.72 | 0.30 |

TABLE 3-continued

SHIP'S ACCELERATION FOR EMPL OF  6  KILOMETERS
MASS RATIO IN THOUSANDS

| | 1 | | 2 | | 3 | | 4 | | 5 | |
|---|---|---|---|---|---|---|---|---|---|---|
| V | G | T | G | T | G | T | G | T | G | T |
| 45 | 17.20 | 0.27 | 8.61 | 0.27 | 5.74 | 0.27 | 4.30 | 0.27 | 3.44 | 0.27 |
| 50 | 21.24 | 0.24 | 10.62 | 0.24 | 7.08 | 0.24 | 5.31 | 0.24 | 4.25 | 0.24 |

Table 4
This table gives the same data as table 3 except that the length of the on board electromagnetic projectile launcher is 10 kilometers instead of 6 kilometers as in table 3.

TABLE 4

SHIP'S ACCELERATION FOR EMPL OF  10  KILOMETERS
MASS RATIO IN THOUSANDS

| | 1 | | 2 | | 3 | | 4 | | 5 | |
|---|---|---|---|---|---|---|---|---|---|---|
| V | G | T | G | T | G | T | G | T | G | T |
| 5 | 0.13 | 4.00 | 0.06 | 4.00 | 0.04 | 4.00 | 0.03 | 4.00 | 0.03 | 4.00 |
| 10 | 0.51 | 2.00 | 0.25 | 2.00 | 0.17 | 2.00 | 0.13 | 2.00 | 0.10 | 2.00 |
| 15 | 1.15 | 1.33 | 0.57 | 1.33 | 0.38 | 1.33 | 0.29 | 1.33 | 0.23 | 1.33 |
| 20 | 2.04 | 1.00 | 1.02 | 1.00 | 0.68 | 1.00 | 0.51 | 1.00 | 0.41 | 1.00 |
| 25 | 3.19 | 0.80 | 1.59 | 0.80 | 1.06 | 0.80 | 0.80 | 0.80 | 0.64 | 0.80 |
| 30 | 4.59 | 0.67 | 2.29 | 0.67 | 1.53 | 0.67 | 1.15 | 0.67 | 0.92 | 0.67 |
| 35 | 6.24 | 0.57 | 3.12 | 0.57 | 2.08 | 0.57 | 1.56 | 0.57 | 1.25 | 0.57 |
| 40 | 8.16 | 0.50 | 4.08 | 0.50 | 2.72 | 0.50 | 2.04 | 0.50 | 1.63 | 0.50 |
| 45 | 10.32 | 0.44 | 5.16 | 0.44 | 3.44 | 0.44 | 2.58 | 0.44 | 2.07 | 0.44 |
| 50 | 12.74 | 0.40 | 6.37 | 0.40 | 4.25 | 0.40 | 3.19 | 0.40 | 2.55 | 0.40 |

Table 5
The next item of interest is the amount of power necessary to operate these electromagnetic projectile launchers-especially the ones on board spaceships. The kinetic energy of any mass is given by one half the product of that mass times the square of its velocity.

$$E = 0.5 * m * V * V \qquad (26)$$

If the launchers could operate at 100% efficiency, this would give us a good idea of the power required. Table 5 shows the energy of a one kilogram projectile travelling at the specified velocity, V, in kilometers per second. The energy, E, from equation (26) is in megajoules. The power, P, is given in mega-watts for three different lengths of electromagnetic projectile lauchers. P is calculated by dividing the required energy E by the time T from the corresponding entry of table 1.

(27) $P = E / T$ or substituting from (5)
(28) $P = 0.5 * E * V / D$

TABLE 5

POWER REQUIRED FOR A ONE KILOGRAM MASS
AT VELOCITY, V LENGTH OF EMPL IN KILOMETERS

| | | 6 | 8 | 10 |
|---|---|---|---|---|
| V | E | P | P | P |
| 5 | 12.5 | 5.21 | 3.91 | 3.13 |
| 10 | 50.0 | 41.67 | 31.25 | 25.00 |
| 15 | 112.5 | 127.84 | 105.14 | 84.59 |
| 20 | 200.0 | 333.33 | 250.00 | 200.00 |
| 25 | 312.5 | 651.04 | 488.28 | 390.63 |
| 30 | 450.0 | 1125. | 849. | 671. |
| 35 | 612.5 | 1801. | 1331. | 1074. |
| 40 | 800.0 | 2666. | 2000. | 1600. |
| 45 | 1012.5 | 3750. | 2812. | 2301. |
| 50 | 1250.0 | 5208. | 3906. | 3125. |

Table 6

In order to propel a spaceship of the expected size and mass, it will be necessary to use much more massive projectiles than 1 kilogram. Projectiles of about 1000 kilograms will be required. Fortunately this does not mean that we will need 1000 times the power. The power requirements of table 5 were for continuous operation but such is not required. Electromagnetic projectile launchers can be operated or powered by capacitors which we may take as long as we wish to charge up. This is clearly a tradeoff wherein we can manage with less power if we are willing to accept the penalty of lengthy capacitor charging periods between each projectile launch. To achieve 1000 times the energy of table 5, we can use 10 times the power applied over 100 times the time. In other words, we will take about 100 seconds to charge up the capacitors of the EMPL fully, using 10 times the power given in table 5 in order to launch (or catch) each projectile. Table 6 shows the time, T(in days) required to accelerate the spaceship by one kilometer per second. The number of projectiles, N, was calculated exactly as in table 2. The velocity of the projectiles relative to the spaceship is V, in kilometers per second. The power of the on board EMPL (in megawatts) is indicated by the column headers in the table. The mass ratio, R, used was 2000, the mass of the projectiles was 1000 kilograms, and the length of the ship's EMPL was assumed to be 6 kilometers. The energy of each projectile was calculated from equation (26)—with 'm' set to 1000 kilograms. The capacitor charging time(in minutes) is then given by:

$$CT = E/P/60.0; \qquad (29)$$

Where P is the power of the spaceship's EMPL in megawatts. We have allowed 10% extra time between each projectile launch. Therefore, the time between projectiles, DT(in minutes), is given by:

$$DT = 1.1 * CT; \qquad (30)$$

The total time, T(in days), is therefore given by:

$$T = 2 * DT * N/60.0/24.0;$$

TABLE 6

TIME(T) TO ACCELERATE SPACESHIP BY 1 KM/SEC (IN DAYS) POWER OF SPACESHIP'S EMPL IN MW

| | 100 | | | 200 | | | 400 | | |
|---|---|---|---|---|---|---|---|---|---|
| V | N | DT | T | N | DT | T | N | DT | T |
| 5 | 223 | 2.08 | 0.71 | 223 | 1.04 | 0.35 | 223 | 0.52 | 0.18 |
| 6 | 182 | 3.00 | 0.83 | 182 | 1.50 | 0.42 | 182 | 0.75 | 0.21 |
| 7 | 154 | 4.08 | 0.96 | 154 | 2.04 | 0.48 | 154 | 1.02 | 0.24 |
| 8 | 134 | 5.33 | 1.09 | 134 | 2.67 | 0.55 | 134 | 1.33 | 0.27 |
| 9 | 118 | 6.75 | 1.22 | 118 | 3.38 | 0.61 | 118 | 1.69 | 0.30 |
| 10 | 106 | 8.33 | 1.35 | 106 | 4.17 | 0.67 | 106 | 2.08 | 0.34 |
| 11 | 96 | 10.08 | 1.48 | 96 | 5.04 | 0.74 | 96 | 2.52 | 0.37 |
| 12 | 87 | 12.00 | 1.59 | 87 | 6.00 | 0.80 | 87 | 3.00 | 0.40 |
| 13 | 81 | 14.08 | 1.74 | 81 | 7.04 | 0.87 | 81 | 3.52 | 0.44 |
| 14 | 75 | 16.33 | 1.87 | 75 | 8.17 | 0.94 | 75 | 4.08 | 0.47 |
| 15 | 69 | 18.75 | 1.98 | 69 | 9.38 | 0.99 | 69 | 4.69 | 0.49 |

Table 7—Flight Profile to Mars

With today's technology we can build an EMPL at the North pole of the Moon. The recommended length is 10 kilometers and it will be powered by a 2500 megawatt nuclear power facility. This EMPL should be capable of launching 1000 kilogram projectiles at velocities of up to 20 kilometers per second. From equations (26) and (29) you can see that the capacitor charging time would be about 2 minutes for each launch. Said EMPL will be constructed on a series of circular tracks so that it can be rotated between each launch to compensate for the orbital motions of the Earth and the Moon. The orbital velocity of the Earth is about 29.8 kilometers per second and that of the Moon is about 1.02 kilometers per second.

The spaceship will be assembled in orbit, most likely at one of the Lagrangian points known as L4 or L5. It would then orbit the Earth at the same velocity and period as the Moon itself. Escape velocity at such an orbit is about 1.44 kilometers per second. Thus we would need only about 0.420 kilometers per second of additional velocity in order to escape Earth's gravity.

Said spaceship will be powered by a 500 megawatt nuclear powered electricity generating facility which will drive the on board EMPL. Said on board EMPL will be about 6 kilometers long and will be able to launch or catch 1000 kilogram projectiles at velocities of up to 10 kilometers per second. Both said nuclear power facility and said on board EMPL will be constructed using the lightest (lowest mass) materials possible. The target mass of the entire spaceship will be 3000 metric tons so that the ratio of the mass of said spaceship to the mass of the projectiles will be 3000. The crew's quarters will be roughly the shape of a ring with said EMPL passing through its central axis. The crew themselves will be lifted from Earth by one or more of the various aerospace planes now being developed—such as NASP(US) or Sanger(Germany) or Hope(Japan) or SATAN(UK). The crew need not go to the Moon but instead could be moved directly from LEO to the orbiting spaceship thus saving much time, money, and effort. A crew of one thousand persons can be accommodated. They will be supported by crops grown by an on board hydroponics food production facility.

Said spaceship will also be stocked with several hundred projectiles. These will be launched from said on board EMPL to begin the voyage to Mars. Once said spaceship has left lunar orbit, the lunar EMPL can begin launching groups of projectiles to build up the spaceship's velocity. Each group will have a uniform velocity but each group will also be launched about one kilometer per second faster than the previous group so that the spaceship will receive each group at a relative velocity of about 10 kilometers per second. Within each group, the projectiles will be separated by the time and distance corresponding to the capacitor charging time of the on board EMPL.

Table 7 shows the duration of a trip to Mars using the lunar EMPL and spaceship described above. The column labelled 'GR' is the number of the group of projectiles launched from the lunar EMPL. Group 0 is actually not launched from the lunar EMPL but is instead a group launched from the spaceship (its original stock of projectiles). The column labelled 'VP' is the velocity of the projectiles in kilometers per second. Again, group 0 is launched from the spaceship while the other groups are launched from the lunar EMPL. The column labelled 'VS' is the velocity of the spaceship at the start of the launching of the corresponding group (in kilometers per second). The column labelled 'VE' is the velocity of the spaceship at the end of catching and launching of the incoming group of projectiles (in kilometers per second). The column labelled 'TIME' is the elapsed time from the start of the mission—in days. The column labelled 'LEFT' is the number of days to reach Mars if no further groups of projectiles are received. The column labelled 'TRIP' is the total trip time in days if no further groups of projectiles are received. The column labelled 'PROJ' is the total number of projectiles required if none is reused. The column labelled 'DT' shows the number of days that the trip is shortened by the receipt of the current group of projectiles.

TABLE 7

Flight profile to Mars (R = 3000)

| GR | VP | VS | VE | TIME | LEFT | TRIP | PROJ | DT |
|---|---|---|---|---|---|---|---|---|
| 0 | 10.00 | 1.15 | 2.15 | 0.44 | 422.48 | 422.92 | 316 | 0.00 |
| 1 | 12.15 | 2.15 | 3.16 | 0.66 | 286.60 | 287.25 | 474 | 135.67 |
| 2 | 13.16 | 3.16 | 4.17 | 0.88 | 216.60 | 217.48 | 632 | 69.77 |
| 3 | 14.17 | 4.17 | 5.19 | 1.10 | 173.88 | 174.98 | 790 | 42.51 |
| 4 | 15.19 | 5.19 | 6.20 | 1.32 | 145.05 | 146.37 | 948 | 28.61 |
| 5 | 16.20 | 6.20 | 7.21 | 1.54 | 124.26 | 125.80 | 1106 | 20.57 |
| 6 | 17.21 | 7.21 | 8.23 | 1.76 | 108.54 | 110.29 | 1264 | 15.50 |
| 7 | 18.23 | 8.23 | 9.24 | 1.97 | 96.22 | 98.19 | 1422 | 12.10 |
| 8 | 19.24 | 9.24 | 10.25 | 2.19 | 86.29 | 88.48 | 1580 | 9.71 |
| 9 | 20.00 | 10.25 | 11.26 | 2.41 | 78.19 | 80.61 | 1738 | 7.88 |
| 10 | 20.00 | 11.26 | 12.21 | 2.63 | 71.67 | 74.30 | 1896 | 6.31 |
| 11 | 20.00 | 12.21 | 13.11 | 2.85 | 66.28 | 69.14 | 2054 | 5.16 |
| 12 | 20.00 | 13.11 | 13.97 | 3.07 | 61.76 | 64.83 | 2212 | 4.31 |
| 13 | 20.00 | 13.97 | 14.78 | 3.29 | 57.89 | 61.18 | 2370 | 3.65 |
| 14 | 20.00 | 14.78 | 15.56 | 3.51 | 54.54 | 58.05 | 2528 | 3.13 |
| 15 | 20.00 | 15.56 | 16.29 | 3.73 | 51.60 | 55.33 | 2686 | 2.72 |
| 16 | 20.00 | 16.29 | 16.99 | 3.95 | 49.00 | 52.95 | 2844 | 2.39 |
| 17 | 20.00 | 16.99 | 17.65 | 4.17 | 46.67 | 50.84 | 3002 | 2.11 |

TABLE 7-continued

| | | | Flight profile to Mars (R = 3000) | | | | |
|---|---|---|---|---|---|---|---|
| GR | VP | VS | VE | TIME | LEFT | TRIP | PROJ | DT |
| 18 | 20.00 | 17.65 | 18.28 | 4.39 | 44.56 | 48.95 | 3160 | 1.88 |
| 19 | 20.00 | 18.28 | 18.88 | 4.61 | 42.65 | 47.26 | 3318 | 1.69 |
| 20 | 20.00 | 18.88 | 19.45 | 4.83 | 40.90 | 45.73 | 3476 | 1.53 |

Conclusion

It has been known for many years that electromagnetic projectile launchers are capable of accelerating projectiles to very high velocities and many authors have suggested using them for throwing various payloads vis a vis throwing water (from Earth) into LEO to be electrolized into hydrogen and oxygen or for throwing lunar products from the Moon into lunar orbit, but this invention is the first to suggest using electromagnetic projectile launchers to catch projectiles. This invention recognizes that the transfer of momentum from the projectile to the spaceship constitutes a propulsion system. It is nearly "fuelless" because it is powered by a nuclear reactor which converts mass into energy according to Einstein's equation $E=m*c*c$. Therefore, the spaceship need not carry tons and tons of chemical propellents. This means a tremendous cost savings over conventional rockets. Conversely this also means that the fraction of the total mass of the spaceship which is payload can be much higher notwithstanding the great mass of the nuclear power facility and the electromagnetic projectile launcher. This means the spaceship can accommodate a much larger crew which in turn means that the cost per person is dramatically lower. Because the projectiles travel at such high speeds, the spaceship too can be accelerated to very high speed. This means that the travel time to Mars (or elsewhere) is greatly reduced and that human missions to the outer planets are now possible. In addition, due to the rotation of the spaceship for purposes of stabilization of the platform, the crew will experience artificial gravity. This will allow them to live and work in a familiar environment and will relieve them of exercise programs. Their muscles will not atrophy and their bones will not decalcify.

The second embodiment is the mass transfer system. It allows payloads to be moved through space at very high speeds. It could be used to deliver very valuable products from distant planets or satellites to Earth or vis versa. Or ir could be used for interplanetary mail service.

The third embodiment is the lunar supply system. Superficially this may seem to be an obvious extension of the idea of throwing things into LEO from the Earth, but it is not. Simply throwing something to the Moon is not very useful because you have little control over where it will land. This invention shows how the materials launched from Earth can be delivered to specific targets on the Moon by using "smart" projectiles and guidance facilities on the Moon.

I claim:

1. A space travel system comprising:
   a spaceship,
   a first electromagnetic projectile launcher for launching momentum transfer projectiles,
   a second electromagnetic projectile launcher mounted to said spaceship which is capable of both launching and catching said projectiles,
   said spaceship further comprising:
   a guidance system to assure said projectiles are caught by said second projectile launcher,
   living quarters suitable to sustain a human crew for an extended period of time,
   an electric power source,
   and means for connecting said second electromagnetic projectile launcher and said electric power source with said living quarters.

2. A spaceship of claim 1 wherein said electric power source is a nuclear-powered electricity generating facility.

3. A method of space travel by momentum transfer comprising the steps of:
   (a) building a first electromagnetic launcher for launching momentum transfer projectiles,
   (b) building an electric power source,
   (c) building a spaceship having living quarters suitable to sustain a human crew for an extended period of time,
   (d) building a second electromagnetic projectile launcher mounted to said spacecraft capable of both launching and catching said projectiles,
   (e) connecting said spaceship, said second electromagnetic projectile launcher and said electric power source,
   (f) mounting a guidance system on said spaceship to ensure said projectiles are caught by said second electromagnetic launcher, and
   (g) propelling said spaceship together with said second electromagnetic projectile launcher and said electric power source.

4. A method of space travel of claim 3 wherein said electric power source is a nuclear-powered electricity generating facility.

* * * * *